United States Patent Office 3,157,632
Patented Nov. 17, 1964

3,157,632
WATER-INSOLUBLE MONOAZO-DYESTUFFS AND PROCESS FOR PREPARING THEM
Joachim Ribka, Offenbach (Main), Germany, assignor to Farbwerke Hoechst Aktiengesellschaft vormals Meister Lucius & Brüning, Frankfurt am Main, Germany, a corporation of Germany
No Drawing. Filed Nov. 17, 1961, Ser. No. 153,219
Claims priority, application Germany, Nov. 24, 1960, F 32,608
5 Claims. (Cl. 260—193)

The present invention relates to new water-insoluble monoazo-dyestuffs and to a process for preparing them; in particular it relates to dyestuffs having the general formula

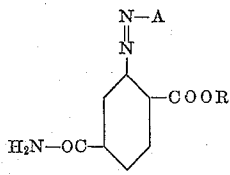

in which R represents a lower alkyl, cycloalkyl, aralkyl or aryl radical, and A represents the radical of a coupling component capable of coupling in a position adjacent to a hydroxyl group and being free from sulfonic acid and carboxylic acid groups.

I have found that valuable water-insoluble monoazo-dyestuffs are obtained by coupling a diazonium compound of an amine having the general formula

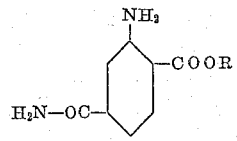

in which R represents a lower alkyl, cycloalkyl, aralkyl or aryl radical, with a coupling component capable of coupling in a position adjacent to a hydroxyl group and being free from sulfonic acid and carboxylic acid groups.

The diazo components used in the process of the present invention can be prepared, for example by saponifying the 1-nitrobenzene-2.5-dicarboxylic acid diester to form the 1-nitrobenzene-2-carboxylic acid ester-5-carboxylic acid, converting this compound into the 1-nitrobenzene-2-carboxylic acid ester-5-carboxylic acid chloride, reacting the product with ammonia to obtain the 1-nitrobenzene-2-carboxylic acid ester-5-carboxylic acid amide and subsequent reduction to form the 1-aminobenzene-2-carboxylic acid ester-5-carboxylic acid amide.

As coupling components there may be used in the process of the present invention compounds capable of coupling in a position adjacent to a hydroxyl group, i.e. aromatic or heterocyclic hydroxyl compounds and compounds containing an enolizable or enolized keto-methylene group in an open carbon chain or in a heterocyclic ring. Such compounds are for example 2-hydroxynaphthalene, 2.3 - hydroxynaphthoic acid amide, 2.3-hydroxynaphthoic acid alkyl amides or arylamides of 2.3-hydroxynaphthoic acid and of acylacetic acids. The arylamide radical may contain one or more substituents which do not impart solubility in water, for example halogen atoms, alkyl, alkoxy, acyloxy, acylamino, arylsulfonylamino, alkylsulfonylamino, trifluoromethyl, nitro, acyl, alkylsulfone, arylsulfone, cyano, carboxylic acid amide, carboxylic acid ester, sulfonic acid amide, sulfonic acid ester or hydroxyl groups. Furthermore, there may be used as coupling components derivatives of 5-pyrazolone, such as for example 1-aryl-3-methyl-5-pyrazolones, 1-aryl-5-pyrazolone-3-carboxylic acid esters or 1-aryl-5-pyrazolone-3-carboxylic acid amides which may contain in the aryl radical one or more of the above-mentioned substituents which do not impart solubility in water, as well as 2.4-dihydroxyquinoline or derivatives of barbituric acid.

The new dyestuffs can be prepared by known methods, for example by coupling the diazonium compounds with the coupling components in an aqueous medium, advantageously in the presence of a dispersing agent, such as a reaction product of ethylene oxide with a fatty alcohol or an alkyl phenol, or in the presence of an alkyl sulfonate or an aryl sulfonate, or in the presence of an organic solvent. In order to obtain the azo-dyestuffs in a favorable granular condition it is advantageous, in some cases, to heat the reaction mixture after the coupling operation, for example for some time to boiling temperature.

The dyestuffs obtainable by the present invention are water-insoluble pigments which are distinguished by a good fastness to light and to solvents. They are suitable for the preparation of colored lacquers or lake formers, for the preparation of colored solutions or products of acetyl cellulose, nitro-cellulose, natural or artificial resins, such as polymerization or condensation resins, for example aminoplasts or phenoplasts, furthermore polystyrene, polyethylene, polypropylene, polyacryl compounds, polyvinyl compounds, such for example as polyvinyl chloride or polyvinyl acetate, polyester, rubber, casein or silicone resins.

Furthermore, they are suitable for pigment printing on a substratum, especially on textile fibers or on other flat structures, such as paper. The new dyestuffs may also be used for other purposes, for example in a state of fine subdivision for dyeing viscose rayon, cellulose ethers or cellulose esters, polyamides or polyurethanes in the spinning solution or for coloring paper.

The following examples serve to illustrate the invention, the parts being by weight unless otherwise stated, and the relationship of parts by weight to parts by volume being the same as that of the kilogram to the liter.

Example 1

19.4 parts of 1-aminobenzene-2-carboxylic acid methylester-5-carboxylic acid amide are stirred for some time with 80 parts by volume of 5 N-hydrochloric acid. The pulp of hydrochloride obtained is diluted with water, cooled with ice to 10° C. and diazotized with 20 parts by volume of 5 N-sodium nitrite solution. The clarified diazo solution is run at a temperature in the range of 50° C. and 60° C. into an aqueous suspension of 28 parts of 1 - (2'.3' - hydroxynaphthoylamino) - 2 - methylbenzene which was prepared by dissolving this compound in dilute sodium hydroxide solution and reprecipitating it with glacial acetic acid in the presence of a reaction product from about 20 mols of ethylene oxide and 1 mol of octadecyl alcohol. During the coupling the mixture is neutralized by the addition of a sodium acetate solution. When the coupling is complete, the dyestuff formed is filtered off, washed and dried. It is a red powder. The coupling may also be carried out in the presence of a substratum adapted for the preparation of color lakes.

*Example 2*

19.4 parts of 1-aminobenzene-2-carboxylic acid methylester-5-carboxylic acid amide are converted into the diazonium compound as described in Example 1. The diazo solution is then run at room temperature into an aqueous suspension of 29 parts of 1-acetoacetylamino-2.5-dimethoxy-4-chlorobenzene which are prepared by dissolving this compound in dilute sodium hydroxide solution and reprecipitating it with glacial acetic acid in the presence of a reaction product from about 20 mols of ethylene oxide and 1 mol of octadecyl alcohol. During the coupling the solution is neutralized by the addition of a sodium acetate solution. When the coupling is complete, the dyestuff suspension is neutralized and boiled for one hour. The dyestuff so obtained is filtered off, washed and dried. It is a yellow powder.

By using in the above-mentioned example instead of 19.4 parts of 1-aminobenzene-2-carboxylic acid methylester-5-carboxylic acid amide, 20.8 parts of 1-aminobenzene-2-carboxylic acid ethylester-5-carboxylic acid amide or 22.2 parts of 1-amino-2-carboxylic acid-n-propylester-5-carboxylic acid amide, yellow dyestuffs are likewise obtained.

The coupling may also be carried out in the presence of a substratum adapted for the preparation of color lakes.

*Example 3*

19.4 parts of 1-aminobenzene-2-carboxylic acid methylester-5-carboxylic acid amide are diazotized as described in Example 1. The clarified diazo solution is combined with a filtered solution of 15 parts of 1-(2'.3'-hydroxynaphthoylamino)-4-methoxybenzene in 350 parts by volume of pyridine. When the coupling is complete, the dyestuff so obtained is filtered off, washed and dried. It is a red powder which dyes polyvinyl chloride red tints having a good fastness to bleeding.

In the following table further components are listed which can be used in the process of the present invention, and also the tints of the printing inks prepared with the dyestuffs obtained from these components.

| Diazo component | Coupling component | Tint |
| --- | --- | --- |
| 1-aminobenzene-2-carboxylic acid methylester-5-carboxylic acid amide. | 2.3-hydroxynaphthoylaminobenzene | Yellowish red. |
| Do | 1-(2'.3'-hydroxynaphthoylamino)-4-methylbenzene | Do. |
| Do | 1-(2'.3-hydroxynaphthoylamino)-2-methoxybenzene | Do. |
| Do | 1-(2'.3'-hydroxynaphthoylamino)-2-ethoxybenzene | Orange. |
| Do | 1-(2'.3'-hydroxynaphthoylamino)-4-ethoxybenzene | Yellowish red. |
| Do | 1-(2'.3'-hydroxynaphthoylamino)-2-methyl-5-chlorobenzene | Do. |
| Do | 1-(2'.3'-hydroxynaphthoylamino)-2-methoxy-5-chlorobenzene | Do. |
| Do | 1-(2'.3'-hydroxynaphthoylamino)-2.4-dimethylbenzene | Do. |
| Do | 1-(2'.3'-hydroxynaphthoylamino)-2.3-dimethylbenzene | Do. |
| Do | 1-(2'.3'-hydroxynaphthoylamino)-2-methyl-4-methoxybenzene | Red. |
| Do | 1-(2'.3'-hydroxynaphthoylamino)-2.5-dimethoxy-4-chlorobenzene | Yellowish red. |
| Do | 1-(2'.3'-hydroxynaphthoylamino)-2.4-dimethoxy-5-chlorobenzene | Brownish red. |
| Do | 1-(2'.3'-hydroxynaphthoylamino)-naphthalene | Red. |
| Do | 1-(2'.3'-hydroxynaphthoylamino)-2.5-dimethoxybenzene | Yellowish red. |
| Do | 2-(2'.3'-hydroxynaphthoylamino)-naphthalene | Red. |
| Do | 2-(2'.3'-hydroxynaphthoylamino)-3-methoxy-diphenylene oxide | Do. |
| Do | 1-(2'.3'-hydroxynaphthoylamino)-3-nitrobenzene | Bluish red. |
| Do | 1-(2'.3'-hydroxynaphthoylamino)-4-methylsulfonylaminobenzene | Red. |
| Do | 1-(2'.3'-hydroxynaphthoylamino)-4-benzenesulfonylaminobenzene | Orange. |
| Do | 1-(2'.3'-hydroxynaphthoylamino)-4-hydroxybenzene | Yellowish red. |
| Do | 1-(2'.3'-hydroxynaphthoylamino)-2-methyl-4-chlorobenzene | Do. |
| Do | 1-(2'.3'-hydroxynaphthoylamino)-2-methoxybenzene-5-carboxylic acid amide | Red. |
| Do | 1-(2'.3'-hydroxynaphthoylamino)-4-methylbenzene-3-sulfonic acid amide | Do. |
| Do | 1-(2'.3'-hydroxynaphthoylamino)-benzene-4-carboxylic acid amide | Do. |
| Do | 2.3-hydroxynaphthoic acid amide | Yellowish red. |
| Do | 2-hydroxynaphthalene | Orange. |
| Do | 1-acetoacetylamino-2-methoxybenzene | Greenish yellow. |
| Do | 1-acetoacetylamino-4-methoxybenzene | Do. |
| Do | 1-acetoacetylamino-2-methylbenzene | Do. |
| Do | 1-acetoacetylamino-2.4-dimethylbenzene | Do. |
| Do | 1-acetoacetylamino-2-methyl-4-chlorobenzene | Do. |
| Do | 1-acetoacetylamino-2-methyl-3-chlorobenzene | Do. |
| Do | 1-acetoacetylamino-2.4-dimethoxybenzene | Yellow. |
| Do | 1-acetoacetylamino-2.4-dimethoxybenzene | Do. |
| Do | 1-acetoacetylamino-2-methoxy-4-chlorobenzene | Do. |
| Do | 1-acetoacetylamino-2-methyl-4-methoxybenzene | Do. |
| Do | 1-acetoacetylamino-4-acetylaminobenzene | Greenish yellow. |
| Do | 1-acetoacetylamino-2-methyl-4-acetylaminobenzene | Do. |
| Do | 1-acetoacetylamino-2-methoxy-4-acetylaminobenzene | Yellow. |
| Do | 1-acetoacetylamino-2-chloro-4-acetylaminobenzene | Greenish yellow. |
| Do | 1-acetoacetylamino-3-methyl-4-acetylaminobenzene | Do. |
| Do | 1-acetoacetylamino-3-chloro-4-acetylaminobenzene | Do. |
| Do | 1-acetoacetylamino-3-methoxy-4-acetylaminobenzene | Yellow. |
| Do | 1-acetoacetylamino-3-acetylaminobenzene | Greenish yellow. |
| Do | 1-acetoacetylamino-3-acetylamino-4-methoxybenzene | Yellow. |
| Do | 1-acetoacetylamino-2-methyl-5-acetylaminobenzene | Greenish yellow. |
| Do | 1-acetoacetylamino-2-methoxy-5-acetylaminobenzene | Yellow. |
| Do | 1-acetoacetylamino-4-propionylaminobenzene | Greenish yellow. |
| Do | 1-acetoacetylamino-4-benzoylaminobenzene | Yellow. |
| Do | 1-acetoacetylamino-4-benzenesulfonylaminobenzene | Do. |
| Do | 1-acetoacetylamino-3.4-bis-acetylaminobenzene | Do. |
| Do | 1-acetoacetylamino-2.4-bis-acetylaminobenzene | Do. |
| Do | 1-acetoacetylamino-4-hydroxybenzene | Reddish yellow. |
| Do | 1-acetoacetylamino-2-methyl-4-methoxy-5-chlorobenzene | Yellow. |
| Do | 1-acetoacetylamino-2.4-dimethoxy-5-chlorobenzene | Do. |
| Do | 1-acetoacetylamino-2-methyl-4-acetylamino-5-chlorobenzene | Do. |
| Do | 1-acetoacetylamino-2-methoxy-4-acetylamino-5-chlorobenzene | Do. |
| Do | 1-acetoacetylamino-2-chloro-4-acetylamino-5-methoxybenzene | Do. |
| Do | 1-acetoacetylamino-2-chloro-4-acetylamino-5-methylbenzene | Greenish yellow. |
| Do | 1-acetoacetylamino-naphthalene | Do. |
| Do | 2-acetoacetylamino-napththalene | Do. |
| Do | 1-phenyl-3-methyl-5-pyrazolone | Reddish yellow. |
| Do | 1-(4'-acetylaminophenyl)-3-methyl-5-pyrazolone | Do. |
| Do | 1-phenyl-5-pyrazolone-3-carboxylic acid amide | Do. |
| Do | 1-(4'-chlorophenyl)-3-methyl-5-pyrazolone | Yellow. |
| Do | 1-(4'-sulfamidophenyl)-3-methyl-5-pyrazolone | Do. |
| Do | 2.4 dihydroxyquinoline | Greenish yellow. |
| 1-aminobenzene-2-carboxylic acid ethylester-5-carboxylic acid amide. | 1-acetoacetylamino-2-methoxy-4-acetylamino-5-chlorobenzene | Yellow. |
| Do | 1-acetoacetylamino-4-acetylaminobenzene | Do. |

I claim:
1. A water-insoluble monazo-dyestuff whose formula is selected from the group consisting of

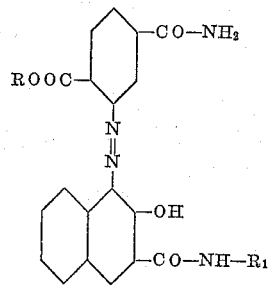

and

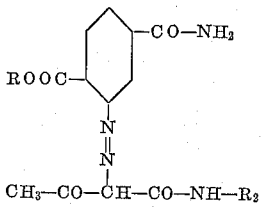

in which R represents a member selected from the group consisting of methyl, ethyl and propyl, $R_1$ represents a member selected from the group consisting of hydrogen, phenyl, methylphenyl, methoxyphenyl, ethoxyphenyl, nitrophenyl, methylsulfonylaminophenyl, benzenesulfonylaminophenyl, hydroxyphenyl, methylchorophenyl, methoxychlorophenyl, dimethylphenyl, methylmethoxyphenyl, dimethoxyphenyl, dimethoxychlorophenyl, naphthyl, carbamylphenyl, methoxycarbamylphenyl, methylsulfamylphenyl and methoxydiphenylene oxide, and $R_2$ represents a member selected from the group consisting of methylphenyl, methoxyphenyl, hydroxyphenyl, acetylaminophenyl, propionylaminophenyl, benzoylaminophenyl, benzenesulfonylaminophenyl, dimethylphenyl, methylchlorophenyl, dimethoxyphenyl, methoxychlorophenyl, methylmethoxyphenyl, methylacetylaminophenyl, methoxyacetylaminophenyl, acetylaminochlorophenyl, bisacetylaminophenyl, methylmethoxychlorophenyl, dimethoxychlorophenyl, methylacetylaminochlorophenyl, methoxyacetylaminochlorophenyl and naphthyl.

2. The water-insoluble monoazo-dyestuff of the formula

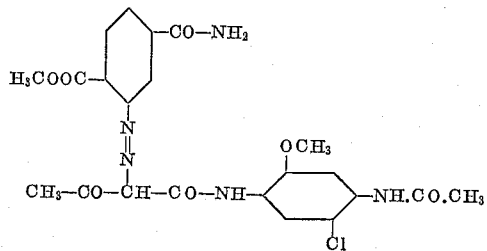

3. The water-insoluble monoazo-dyestuff of the formula

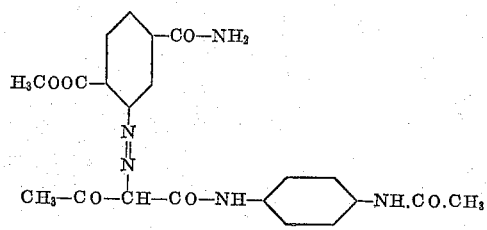

4. The water-insoluble monoazo-dyestuff of the formula

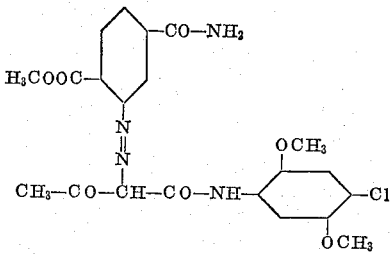

5. The water-insoluble monoazo-dyestuff of the formula

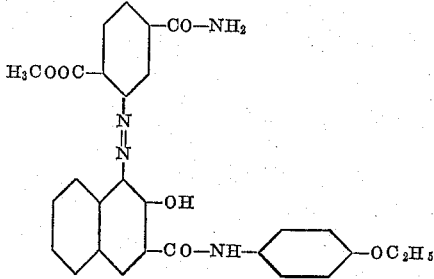

References Cited in the file of this patent
UNITED STATES PATENTS

| | | |
|---|---|---|
| 1,914,427 | Heyna | June 20, 1933 |
| 2,019,914 | Kracker | Nov. 5, 1935 |

FOREIGN PATENTS

| | | |
|---|---|---|
| 921,592 | Germany | Dec. 23, 1954 |
| 536,606 | Italy | Dec. 7, 1955 |